United States Patent
Aitidis et al.

(10) Patent No.: US 11,565,668 B2
(45) Date of Patent: Jan. 31, 2023

(54) CONTROL OF A VEHICLE DRIVER ASSISTANCE SYSTEM

(71) Applicant: JAGUAR LAND ROVER LIMITED, Warwickshire (GB)

(72) Inventors: Ilias Aitidis, Coventry (GB); Richard Hillman, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 139 days.

(21) Appl. No.: 16/340,234

(22) PCT Filed: Sep. 26, 2017

(86) PCT No.: PCT/EP2017/074346
§ 371 (c)(1),
(2) Date: Apr. 8, 2019

(87) PCT Pub. No.: WO2018/069037
PCT Pub. Date: Apr. 19, 2018

(65) Prior Publication Data
US 2019/0241161 A1 Aug. 8, 2019

(30) Foreign Application Priority Data
Oct. 10, 2016 (GB) .................................... 1617181

(51) Int. Cl.
*B60T 7/12* (2006.01)
*B62D 15/02* (2006.01)
(Continued)

(52) U.S. Cl.
CPC ................. *B60T 7/12* (2013.01); *B60T 7/22* (2013.01); *B60W 10/18* (2013.01); *B60W 30/09* (2013.01);
(Continued)

(58) Field of Classification Search
CPC ................. B60T 7/12; B60T 2201/022; B60T 2220/00; B60T 2220/04; B60T 2230/00;
(Continued)

(56) References Cited

U.S. PATENT DOCUMENTS

| 5,278,764 A | 1/1994 | Iizuka et al. |
| 6,017,102 A | 1/2000 | Aga |

(Continued)

FOREIGN PATENT DOCUMENTS

| DE | 19647430 A1 | 5/1998 |
| DE | 102009027379 A1 | 1/2011 |

(Continued)

OTHER PUBLICATIONS

Combined Search and Examination Report under Sections 17 and 18(3) for Application No. GB1617181.1 dated Apr. 3, 2017.
International Search Report and Written Opinion of the International Searching Authority for International application No. PCT/EP2017/074346 dated Dec. 7, 2017.
(Continued)

*Primary Examiner* — Mahmoud S Ismail
*Assistant Examiner* — Gabriel Anfinrud
(74) *Attorney, Agent, or Firm* — Carlson, Gaskey & Olds, P.C.

(57) ABSTRACT

A control system (100) for an emergency braking system (200) using at least one transmitter/receiver sensor (210) comprising: means for causing automatic transition, from a first state (310) in which the emergency braking system (200) is inactive to a second state (320) in which the emergency braking system (200) is active, in dependence upon satisfaction of a first condition (412); and means for causing automatic transition from the second state (320) to the first state (310) in dependence upon satisfaction of a second condition (421) different to the first condition (412) wherein transition from the second state (320) to the first
(Continued)

state (310) does not occur in dependence upon the first condition (412) no longer being satisfied, and/or transition from the first state (320) to the second state (310) does not occur in dependence upon the second condition (421) no longer being satisfied.

20 Claims, 2 Drawing Sheets

(51) Int. Cl.
  *B60T 7/22* (2006.01)
  *B60W 10/18* (2012.01)
  *B60W 30/09* (2012.01)
  *F16H 63/40* (2006.01)

(52) U.S. Cl.
  CPC ....... *B62D 15/027* (2013.01); *B62D 15/0285* (2013.01); *F16H 63/40* (2013.01); *B60T 2201/022* (2013.01); *B60T 2220/00* (2013.01); *B60T 2220/04* (2013.01); *B60T 2230/00* (2013.01); *B60T 2230/08* (2013.01); *B60T 2250/00* (2013.01); *B60T 2250/04* (2013.01)

(58) Field of Classification Search
  CPC ............ B60T 2230/08; B60T 2250/00; B60T 2250/04; B60W 10/18; B60W 30/09; B62D 15/027; B62D 15/0285; F16H 63/40
  See application file for complete search history.

(56) References Cited

U.S. PATENT DOCUMENTS

| | | |
|---|---|---|
| 6,577,334 B1 | 6/2003 | Kawai et al. |
| 2002/0091479 A1 | 7/2002 | Maruko et al. |
| 2008/0221758 A1* | 9/2008 | Bernzen .............. B60R 21/0132 701/45 |
| 2008/0245597 A1 | 10/2008 | Paulson |
| 2012/0212353 A1* | 8/2012 | Fung ................... B60K 28/066 340/905 |
| 2012/0265418 A1* | 10/2012 | Foerster ................ G08G 1/166 701/70 |
| 2016/0016560 A1 | 1/2016 | Parker et al. |
| 2016/0068143 A1 | 3/2016 | Schanz et al. |
| 2017/0329332 A1* | 11/2017 | Pilarski ............ B60W 30/0956 |
| 2018/0118203 A1* | 5/2018 | Minemura .............. B60R 21/00 |
| 2018/0304887 A1* | 10/2018 | Nordbruch ............. G08G 1/164 |

FOREIGN PATENT DOCUMENTS

| | | |
|---|---|---|
| EP | 1010596 A2 | 6/2000 |
| EP | 2902291 A1 | 8/2015 |
| WO | 2016/059753 A1 | 4/2016 |
| WO | 2016/084967 A1 | 6/2016 |

OTHER PUBLICATIONS

Anonymous: "Mercedes CLS operator's manual," Jan. 1, 2014, pp. 1-380, XP055427967, USA Retrieved from the internet: URL:https://www.mbusa.com/vcm/MB/DigitalAssets/pdfmb/ownersmanual/2014_CLS.pdf [retrieved on Nov. 22, 2017] p. 184-p. 185.

* cited by examiner

CONTROL OF A VEHICLE DRIVER ASSISTANCE SYSTEM

TECHNICAL FIELD

The present disclosure relates to control of a vehicle driver assistance system. In particular, but not exclusively it relates to control of a vehicle driver assistance system that uses at least one transmitter/receiver sensor. Aspects of the invention relate to a system, a vehicle, a method, and a computer program.

BACKGROUND

A transmitter/receiver sensor is an inexpensive and practical sensor for detecting an environment near to a vehicle. A transmitter/receiver sensor comprises a transmitter and a receiver. The transmitter transmits a signal that is reflected by the environment near to a vehicle. The reflected signal is detected by the receiver. The transmitter may transmit electro-magnetic waves (e.g. radio detection and ranging (radar) or light detection and ranging (lidar)) and the receiver may then detect the reflected electromagnetic waves. Perhaps more commonly the transmitter may transmit ultrasonic sound waves and the receiver may then detect the reflected ultrasonic sound waves.

The use of transmission and reflection to sense the environment may result is false positives if there is another source of the signal and/or if there is a strong reflection from anything other than a hazard and/or if the sensor is slow to respond to a change in environment.

Other environmental detection systems are possible but they are often more complex. For example a stereoscopic camera system may be used to image an environment external to a vehicle. Computer vision analysis may be used to identify and track objects. The parallax effect may be used to range an identified object. This system, however, requires at least two cameras and also image processing capabilities. It can also only range an identified object and has poor performance where this is not possible.

Vehicle driver assistance systems are systems that operate automatically or semi-automatically to assist a driver.

Examples of vehicle driver assistance systems include, for example, automatic higher-speed collision avoidance system, parking assistance systems, automatic braking systems, automatic torque control/vectoring systems, cruise control systems, automatic lighting systems, automatic windscreen wiper systems. Some of these driver assistance systems automatically control acceleration and/or deceleration of the vehicle and these systems are called acceleration-control driver assistance systems in this document. Some of these driver assistance systems automatically cause emergency braking, for example full-stop braking, of the vehicle and these systems are called emergency-braking-control driver assistance systems (also called emergency braking systems) in this document. Full-stop braking is braking that applies a deceleration not less than 5 m/s$^2$, sufficient to quickly stop the vehicle, until the vehicle has stopped, there has been a collision, or an event has caused an interrupt (e.g. a driver has caused an interrupt by for example depressing the accelerator pedal or e.g. the system has caused an interrupt because there is no longer a threat, for example because an obstacle has moved).

It will be appreciated that the intervention of a driver assistance system is a positive experience for a driver when the intervention is helpful or necessary.

It will be appreciated that the intervention of a driver assistance system is a negative experience for a driver when the intervention is neither helpful nor necessary.

An incorrect automatic intervention by a driver assistance system may be particularly concerning and/or unwelcome for acceleration-control driver assistance systems and emergency-braking-control driver assistance systems (also called emergency braking systems). These incorrect automatic interventions may occur, for example, when the vehicle driver assistance system uses a transmitter/receiver sensor and the transmitter/receiver sensor gives a false positive, causing an automatic intervention.

As an example a vehicle driver parking assistance system may among other functions provide an emergency-braking-control driver assistance systems (also called emergency braking systems) that uses an ultrasonic transmitter/receiver sensor for avoiding low speed collisions. However, the incorrect intervention of the emergency-braking-control driver assistance system arising from false positives from the ultrasonic transmitter/receiver sensor may be problematic if it prevents or interferes with low-speed vehicle movement desired by a vehicle driver. Low speed is speed less than a threshold speed, which may be 15 km/h, for example.

It is an aim of the present invention to provide an improved driver assistance system that uses a transmitter/receiver sensor.

SUMMARY OF THE INVENTION

Aspects and embodiments of the invention provide a system, a vehicle, a method and a computer program as claimed in the appended claims.

According to an aspect of the invention there is provided a control system for a driver assistance system of a vehicle using at least one transmitter/receiver sensor, the control system comprising:

first means for causing automatic transition, between a first state in which the vehicle driver assistance system is inactive and a second state in which the vehicle driver assistance system is active, in dependence upon satisfaction of a first condition; and second means for causing automatic transition between the second state and the first state in dependence upon satisfaction of a second condition different to the first condition.

The first means for causing automatic transition and/or the second means for causing automatic transition may comprise at least one of a controller, a control unit, a computational device and an electronic processor.

The first means causes automatic transition from the first state to the second state in dependence upon satisfaction of the first condition and the second means causes automatic transition from the second state to the first state in dependence upon satisfaction of the second condition. However, transition from the second state to the first state does not occur in dependence upon the first condition no longer being satisfied, and/or transition from the first state to the second state does not occur in dependence upon the second condition no longer being satisfied.

In some examples, the second means does not cause automatic transition from the second state to the first state in dependence upon the first condition no longer being satisfied, thereby maintaining the second state in which the vehicle driver assistance system is active while the first condition is no longer satisfied and until the second condition is satisfied.

This controls when the vehicle driver assistance is active and when it is no longer active using different potentially unrelated conditions. The activation and deactivation of vehicle driver assistance system can therefore be separately controlled.

In some examples, the first means does not cause automatic transition from the first state to the second state in dependence upon the second condition no longer being satisfied, thereby maintaining the first state in which the vehicle driver assistance system is inactive while the second condition is no longer satisfied and until the first condition is satisfied.

This controls when the vehicle driver assistance is inactive and when it is no longer inactive using different potentially unrelated conditions. The activation and deactivation of the vehicle driver assistance system can therefore be separately controlled.

The vehicle driver assistance system may be an emergency braking system.

According to an aspect of the invention there is provided a control system for an emergency braking system of a vehicle using at least one transmitter/receiver sensor, the control system comprising:
means for causing automatic transition, from a first state in which the emergency braking system is inactive to a second state in which the emergency braking system is active, in dependence upon satisfaction of a first condition; and
means for causing automatic transition from the second state to the first state in dependence upon satisfaction of a second condition different to the first condition; wherein
transition from the second state to the first state does not occur in dependence upon the first condition no longer being satisfied, and/or transition from the first state to the second state does not occur in dependence upon the second condition no longer being satisfied.

The first means for causing automatic transition and/or the second means for causing automatic transition may comprise at least one of a controller, a control unit, a computational device and an electronic processor.

In some examples, the second state provides for autonomous emergency braking at low speed and the first state does not provide for autonomous emergency braking at low speed. When used here and throughout the specification, the term "low speed" is intended to mean speed of a vehicle being below a threshold value, which may be, for example, 15 km/h.

The first condition may, for example, be satisfied when a high steering angle is detected. When used here and throughout the specification, the term "high steering angle" is intended to mean a steering angle being above a threshold value, which may be, for example 20° from a central steering wheel position.

According to an example there is provided the control system, wherein the transmitter/receiver sensor is an ultrasonic sensor, a radar sensor or a lidar sensor. The control system may therefore use existing inexpensive sensor technology. The transmitter/receiver sensor may in some examples have a range of less than 2, 3 or 5 m.

According to an example there is provided the control system, wherein the emergency braking system is a parking assistance system, wherein the first state is a state in which the parking assistance system is inactive and the second state is a state in which the parking assistance system is active.

The control system therefore controls when the parking assistance system is active and when it is inactive. The first condition for activating the parking assistance system may be a condition that is indicative of a vehicle comprises or is connected to the control system being in a parking situation. This may require a high level of confidence (i.e. a confidence above a threshold value) using multiple sub-conditions, for example. The second condition for de-activating the parking assistance system may be a condition that is indicative of a vehicle which comprises or is connected to the control system no longer being in a parking situation. This again may require a high level of confidence using multiple sub-conditions, for example.

For example, the second state may be a state in which an on-road vehicle driver assistance system is active and the first state may be a state in which the on-road vehicle driver assistance system is inactive.

The second condition for de-activating the parking assistance system may be a condition that is indicative of an on-road situation. This may require a high level of confidence (i.e. a confidence above a threshold value) using multiple sub-conditions, for example For example, the second state may be a state in which an off-road vehicle driver assistance system is active and the first state may be a state in which the off-road vehicle driver assistance system is inactive.

The second condition for de-activating the parking assistance system may be a condition that is indicative of an on-off situation. This may require a high level of confidence (i.e. a confidence above a threshold value) using multiple sub-conditions, for example.

According to an example there is provided the control system, wherein the control system is arranged to enable asymmetrical transition between the first state and the second state wherein satisfaction of the first condition causes automatic transition from the first state to the second state but non-satisfaction of the first condition does not cause automatic transition from the second state to the first state.

The asymmetry of the transition provides a memory effect which can be used to make a state more or less 'sticky' (i.e. more easily or less easily exited).

According to an example there is provided the control system, wherein all transitions from the first state to the second state are asymmetric.

All transitions may be asymmetric so that there is no symmetric transitions between the first state and second state.

The satisfaction of the first condition may comprise satisfaction of one or more conditions at one point in time and/or satisfaction of one or more conditions at multiple points in time and/or satisfaction of one or more conditions over one or more time durations.

The satisfaction of the second condition may comprise satisfaction of one or more conditions at one point in time and/or satisfaction of one or more conditions at multiple points in time and/or satisfaction of one or more conditions over one or more time durations.

According to an example there is provided the control system, wherein satisfaction of the first condition comprises assessment by the control system of at least one first parameter and satisfaction of the second condition comprises assessment by the control system of at least one second parameter, wherein the first parameter and the second parameter are different.

According to an example there is provided the control system, wherein the first condition is defined by a first Boolean expression of first parameters and the first condition is satisfied when the first Boolean expression is true. In some but not necessarily all examples, the second condition cannot be defined as a Boolean expression of the first parameters.

According to an example there is provided the control system, wherein the second condition is defined by a second Boolean expression of second parameters and the second condition is satisfied when the second Boolean expression is true.

The use of different Boolean expressions (with or without different parameters) provides for different programming of the conditions using different logic.

According to an example there is provided the control system, wherein the first condition is in dependent upon one or more of the following:
  selection of a parking system of the vehicle;
  a high steering angle of the vehicle;
  selection of reverse gear of the vehicle;
  high steering angular velocity of the vehicle (i.e. the rate of change of steering angle being above a threshold value, which may be, for example, 10°/s);
  reverse movement of the vehicle being greater than a threshold distance (i.e. the vehicle moving in reverse by a distance which is greater than a threshold value, which may be, for example, 1 m);
  current geographic location;
  interpretation of camera images obtained by a camera comprised within or mounted to the vehicle;
  data from the transmitter/receiver sensor;
  speed of the vehicle being below a threshold value for a threshold duration;
  the vehicle being static and/or unoccupied for an extended duration;
  the vehicle being in an ignition key-off state;
  head movements and/or eye movements of a driver of the vehicle;
  a high steering angle in combination with low speed or low acceleration of the vehicle (i.e. the speed or acceleration of the vehicle being below a threshold value);
  reverse movement and inclination of the vehicle.

One or more of these parameters may be used to define a first condition that is indicative of a need for parking assistance. One or more of these parameters may be used to define the first condition to a high level of confidence (i.e. a confidence above a threshold value).

According to an example there is provided the control system, wherein the second condition is dependent upon one or more of the following:
  speed of the vehicle being above a threshold value;
  acceleration of the vehicle being above a threshold value;
  accelerator pedal of the vehicle being depressed beyond a threshold distance;
  rate of increase of accelerator pedal depression beyond a threshold;
  high gear during forward motion of the vehicle;
  current location of the vehicle;
  data from the transmitter/receiver sensor;
  interpretation of camera images obtained by a camera comprised within or connected to the vehicle;
  traffic in the vicinity of the vehicle suggests free flow conditions on an open road; detection of approaching vehicles or objects at speeds or acceleration above a threshold.

One or more of these parameters may be used to define a second condition that is indicative of a need for on-road driver assistance. One or more of these parameters may be used to define the second condition to a high level of confidence (i.e. a confidence above a threshold value). The second condition may be indicative of there no longer being a need for parking assistance.

According to an example there is provided the control system, wherein the second condition is dependent upon one or more of the following parameters:
  suspension movement of the vehicle being above a threshold;
  selection of a system of the vehicle for off-road use;
  interpretation of camera images obtained by a camera comprised within or mounted to the vehicle;
  current geographic location of the vehicle;
  data from the transmitter/receiver sensor;
  wheel slip data of the vehicle indicating a low adhesion surface;
  scanning of driving surface indicates high roughness/irregularity or other off-road characteristics.

One or more of these parameters may be used to define a second condition that is indicative of a need for off-road driver assistance. One or more of these parameters may be used to define the second condition to a high level of confidence (i.e. a confidence above a threshold value). The second condition may be indicative of there no longer being a need for parking assistance.

According to an example there is provided the control system, wherein the control system comprises means for receiving a user input interrupt that forces the control system to transition to the first state or to transition to the second state.

In this way, the system allows a user to over-ride the system.

The control system may have particular benefits for controlling a low speed collision avoidance and/or emergency braking system in a parking scenario.

According to an example, the control system is comprised within one or more electronic control units of a vehicle. The control system may be comprised within a parking control module of a vehicle and/or within an assisted braking module of a vehicle.

The control system may be integrated within a dedicated electronic control unit of a vehicle. Alternatively, the control system may be integrated within an electronic control unit which is arranged to perform one or more additional functions.

According to an example, the control system comprises a vehicle bus and at least one electronic control unit of a vehicle. The electronic control unit may be a parking control module of a vehicle and/or an assisted braking module of a vehicle.

The control system may use the vehicle bus to receive an input from one or more sensors, for example from the transmitter/receiver sensor. The input from the one or more sensors may be used to define the first condition and/or the second condition.

According to an example, the control system is comprised within a vehicle at least partially controlled or capable of being at least partially controlled by a user. The control system may be comprised within a vehicle having autonomous capabilities; and optionally may be comprised within a vehicle capable of being driven fully autonomously.

According to another aspect of the invention there is provided a vehicle comprising a control system as described in the foregoing aspect of the invention.

According to an aspect of the invention there is provided a method of controlling a driver assistance system of a vehicle comprising at least one transmitter/receiver sensor, the method comprising:

causing automatic transition, from a first state in which the driver assistance system is inactive and a second state in which the driver assistance system is active, in dependence upon satisfaction of a first condition; and causing automatic transition from the second state to the first state in dependence upon satisfaction of a second condition different to the first condition, wherein transition from the second state to the first state does not occur in dependence upon the first condition no longer being satisfied, and/or transition from the second state to the first state does not occur in dependence upon the second condition no longer being satisfied.

The driver assistance system may be an emergency braking system.

According to an aspect of the invention there is provided a computer program that when loaded into a processor enables:

automatic transition, from a first state in which a driver assistance system, using at least one transmitter/receiver sensor, is inactive to a second state in which the driver assistance system is active, in dependence upon satisfaction of a first condition; and automatic transition from the second state to the first state in dependence upon satisfaction of a second condition different to the first condition, wherein transition from the second state to the first state does not occur in dependence upon the first condition no longer being satisfied, and/or transition from the second state to the first state does not occur in dependence upon the second condition no longer being satisfied.

The driver assistance system may be an emergency braking system.

According to an aspect of the invention there is provided a computer readable medium comprising the computer program of the preceding aspect of the invention; optionally the computer readable medium comprises a non-transitory medium.

According to an aspect of the invention there is provided a control system for autonomous low speed emergency braking system of a vehicle, the control system comprising:

first means for causing automatic transition, from a first state in which the autonomous low speed emergency braking system is inactive to a second state in which the autonomous low speed emergency braking system is active, in dependence upon satisfaction of a first condition; and second means for causing automatic transition from the second state to the first state in dependence upon satisfaction of a second condition different to the first condition; wherein automatic transition from the second state to the first state does not occur in dependence upon the first condition no longer being satisfied and/or automatic transition from the first state to the second state does not occur in dependence upon the second condition no longer being satisfied.

The first means for causing automatic transition and/or the second means for causing automatic transition may comprise at least one of a controller, a control unit, a computational device and an electronic processor.

According to an aspect of the invention there is provided a control system for an emergency braking system of a vehicle using at least one transmitter/receiver sensor, the control system comprising:

means for causing automatic transition, between a first state in which the emergency braking system is inactive and a second state in which the emergency braking system is active, in dependence upon satisfaction of a first condition; and means for causing automatic transition between the second state and the first state in dependence upon satisfaction of a second condition different to the first condition and not causing automatic transition between the second state and the first state in dependence upon the first condition no longer being satisfied, thereby maintaining the second state in which the emergency braking system is active while the first condition is no longer satisfied and until the second condition is satisfied.

The means for causing automatic transition may comprise at least one of a controller, a control unit, a computational device and an electronic processor.

According to an aspect of the invention there is provided a control system for an emergency braking system of a vehicle using at least one transmitter/receiver sensor, the control system comprising:

means for causing automatic transition, to a first state in which the emergency braking system is inactive from a second state in which the emergency braking system is active, in dependence upon satisfaction of a second condition; and means for causing automatic transition to the second state from the first state in dependence upon satisfaction of a first condition different to the second condition and not causing automatic transition to the second state from the first state in dependence upon the second condition no longer being satisfied, thereby maintaining the first state in which the emergency braking system is inactive while the second condition is no longer satisfied and until the first condition is satisfied.

The means for causing automatic transition to the first state and/or to the second state may comprise at least one of a controller, a control unit, a computational device and an electronic processor.

According to an aspect of the invention there is provided control system for an emergency braking system of a vehicle, the control system comprising:

first means for causing transition, from a first state in which the emergency braking system is inactive to a second state in which the emergency braking system is active, in dependence upon satisfaction of a first condition; and second means for causing transition from the second state to the first state in dependence upon satisfaction of a second condition different to the first condition; wherein transition from the second state to the first state does not occur in dependence upon the first condition no longer being satisfied, and/or transition from the first state to the second state does not occur in dependence upon the second condition no longer being satisfied.

The means for causing automatic transition to the first state and/or to the second state may comprise at least one of a controller, a control unit, a computational device and an electronic processor.

According to an aspect of the invention there is provided a control system for a driver assistance system of a vehicle using at least one transmitter/receiver sensor, the control system comprising:

means for causing automatic transition, from a first state in which the driver assistance system is inactive to a second state in which the driver assistance system is active, in dependence upon satisfaction of a first condition; and means for causing automatic transition from the second state to the first state in dependence upon satisfaction of a second condition different to the first condition; wherein transition from the second state to the first state does not occur in dependence upon the first condition no longer being satisfied, and/or transition from the first state to the second state does not occur in dependence upon the second condition no longer being satisfied; wherein the driver assistance system comprises an autonomous low speed emergency braking system and the second state provides for autonomous emergency braking and the first state does not provide for autonomous emergency braking.

The means for causing automatic transition to the first state and/or to the second state may comprise at least one of a controller, a control unit, a computational device and an electronic processor.

According to an aspect of the invention there is provided a control system for an emergency braking system of a vehicle using at least one transmitter/receiver sensor comprising: means for causing automatic transition, from a first state in which the emergency braking system is inactive to a second state in which the emergency braking system is active, in dependence upon satisfaction of a first group of different requisite conditions.

The means for causing automatic transition from the first state to the second state may comprise at least one of a controller, a control unit, a computational device and an electronic processor.

The system may be configured such that if all of the necessary conditions in the group of different requisite conditions are satisfied, then automatic transition can occur. Similarly, if any one of the necessary conditions in the group of different requisite conditions is not satisfied, then automatic transition cannot occur.

The requirement of satisfaction of a first group of different requisite conditions reduces the likelihood of unnecessarily entering the second state. If the second state is not entered, then the emergency braking system remains inactive and emergency braking cannot occur.

In some examples, the first group of different requisite conditions comprises a low vehicle speed condition (i.e. where the speed of a vehicle comprising or connected to the control system is below a threshold value) and at least one first additional condition. The requirement of satisfaction of the at least one first additional condition in addition to a low vehicle speed condition reduces the likelihood of unnecessarily entering the second state. If the second state is not entered, then the emergency braking system remains inactive and emergency braking cannot occur.

In some examples, the at least one first additional condition is dependent upon one or more kinematic parameters and/or one or more driver manoeuvre control parameters and/or one or more vehicle environment parameters. The requirement of satisfaction of an additional condition reduces the likelihood of unnecessarily entering the second state. If the second state is not entered, then the emergency braking system remains inactive and emergency braking cannot occur.

In some examples, the at least one first additional condition is dependent upon one or more of the following:
selection of a parking system of the vehicle;
a high steering angle of the vehicle;
selection of reverse gear of the vehicle;
high steering angular velocity of the vehicle;
reverse movement of the vehicle being greater than a threshold distance;
current geographic location of the vehicle;
interpretation of camera images obtained by a camera comprised within or mounted to the vehicle;
speed of the vehicle being below a threshold value for a threshold duration;
the vehicle having been static and/or unoccupied for an extended duration;
the vehicle having been in an ignition key-off state;
head movements and/or eye movements of a driver of the vehicle;
reverse movement and inclination of the vehicle.

These parameters are indicative of a parking situation. These are preferable used in logical combinations to define some or all of the first group of different requisite conditions that are satisfied when there is a high likelihood of a parking situation (i.e. where the probability of the vehicle being in a parking situation is above a threshold value).

In some examples, satisfaction of the first group of different requisite conditions requires that a first inhibition condition, that prevents the transition from the first state to the second state, is not satisfied. The first inhibition condition may be used to define the first group of different requisite conditions having a high likelihood of correctly identifying a parking situation (i.e. where the probability of the first group of different requisite conditions correctly identifying a parking situation is above a first threshold value) and a low likelihood of incorrectly identifying a parking situation (i.e. where the probability of the first group of different requisite conditions incorrectly identifying a parking situation is below a second threshold value).

In some examples, the first inhibition condition is indicative of a situation in which emergency braking may be dangerous. In some examples, the first inhibition condition is indicative of a situation in which a vehicle is in traffic, which may be indicative of a situation in which the vehicle is stationary in traffic. In some examples, the first inhibition condition is indicative of a situation in which vehicle is at a road junction. In some examples, the first inhibition condition is indicative of a situation in which vehicle is at a railway or tram line.

In some examples, the first inhibition condition is a condition dependent upon one or more kinematic parameters and/or one or more driver manoeuvre control parameters and/or one or more vehicle environment parameters. The first inhibition condition is indicative of one or more particular situations that may be similar to parking situations (i.e. a low speed condition) but where emergency braking should not occur.

In some examples, the first inhibition condition is dependent upon one or more of the following parameters:
acceleration of the vehicle being above a threshold;
accelerator pedal of the vehicle being depressed beyond a threshold distance;
rate of increase of accelerator pedal depression beyond a threshold;
current geographic location of the vehicle (this may be compared against locations of known road junctions or other on-road stop locations);
detection of approaching vehicles or objects at speeds or acceleration above a threshold; and interpretation of camera images obtained by a camera comprised within or connected to the vehicle to identify a junction situation (e.g. stop sign, stop line, traffic lights).

These parameters may be used to specify a first inhibition condition that defines one or more particular situations that may be similar to parking situations (i.e. a low speed condition) but where emergency braking should not occur.

In some examples, satisfaction of the first inhibition condition is achieved upon satisfaction of the second condition, wherein satisfaction of the second condition causes automatic transition to the first state, in which the emergency braking system is inactive, from the second state, in which the emergency braking system is active. While satisfaction of the second condition may prevent automatic transition, from the first state to the second state, non-satisfaction of the second condition does not cause automatic transition, from the first state to the second state.

In some examples, the second condition is dependent upon one or more of the following:
  speed of the vehicle being above a threshold;
  acceleration of the vehicle being above a threshold;
  accelerator pedal of the vehicle being depressed beyond a threshold distance;
  rate of increase of accelerator pedal depression beyond a threshold;
  high gear during forward motion of the vehicle;
  current geographical location of the vehicle;
  data from the transmitter/receiver sensor;
  interpretation of camera images obtained by a camera comprised within or mounted to the vehicle;
  traffic in the vicinity of the vehicle suggests free flow conditions on an open road; and detection of approaching vehicles or objects at speeds or acceleration above a threshold.

In some examples, the second condition is dependent upon one or more of the following:
  suspension movement of the vehicle being above a threshold;
  selection of a system of the vehicle for off-road use;
  interpretation of camera images obtained by a camera comprised within or mounted to the vehicle;
  current location of the vehicle;
  data from the transmitter/receiver sensor 210;
  wheel slip data of the vehicle indicating a low adhesion surface; and
  scanning of driving surface indicates high roughness/irregularity or other off-road characteristics.

In some examples the control system comprises comprising means for receiving a user input interrupt that forces the control system to transition to the first state or to transition to the second state.

In some examples, the control system is comprised within a parking control module of a vehicle and/or within an assisted braking module of a vehicle and/or within one or more electronic control units of a vehicle.

In some examples, the control system comprises a vehicle bus and at least one electronic control unit of a vehicle.

According to an aspect of the invention there is provided a vehicle comprising a control system in accordance with any preceding aspect of the invention.

According to an aspect of the invention there is provided a method of controlling an emergency braking system of a vehicle, the method comprising: causing automatic transition, from a first state in which the emergency braking system is inactive to a second state in which the emergency braking system is active, in dependence upon satisfaction of a first group of different requisite conditions.

According to an aspect of the invention there is provided a computer program that when loaded into a processor enables the method of the preceding aspect of the invention.

According to an aspect of the invention there is provided a computer readable medium comprising the computer program of the preceding aspect of the invention; optionally the computer readable medium comprises a non-transitory medium.

According to an aspect of the invention there is provided a control system for an emergency braking system of a vehicle using at least one transmitter/receiver sensor, the control system comprising: means for causing automatic transition, to a first state in which the emergency braking system is inactive from a second state in which the emergency braking system is active, in dependence upon satisfaction of a second group of different necessary conditions.

The means for causing automatic transition to the first state from the second state may comprise at least one of a controller, a control unit, a computational device and an electronic processor.

According to an aspect of the invention there is provided a control system for an emergency braking system of a vehicle using at least one transmitter/receiver sensor, the control system comprising: means for causing automatic transition, between a first state in which the emergency braking system is inactive and a second state in which the emergency braking system is active, in dependence upon satisfaction of a group of different requisite conditions, wherein the group of different requisite conditions is dependent upon the direction of transition.

The means for causing automatic transition between the first state and the second state may comprise at least one of a controller, a control unit, a computational device and an electronic processor.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

The Figures illustrate a control system 100 for a driver assistance system 200 using at least one transmitter/receiver sensor 210, wherein the control system 100 comprises: first means for causing automatic transition 312, between a first state 310 in which the driver assistance system 200 is inactive and a second state 320 in which the driver assistance system 200 is active, in dependence upon satisfaction of a first condition 412; and second means for causing automatic transition 321 between the second state 320 and the first state 310 in dependence upon satisfaction of a second condition 421 different to the first condition 412.

The description of a system as active means that the system is capable of performing at least one relevant function when it is active that it is not capable of performing when it is inactive. The description of a system as active means that the system is enabled to perform at least one relevant function when it is active that it is not enabled to perform when it is inactive. The description of a system as active does not necessarily mean that the system immediately intervenes, further conditions may be required after a state transition to cause intervention, for example. The description of a system as active may mean, but does not necessarily mean that all available functions or all available relevant functions are active (enabled). The description of a system as inactive may mean, but does not necessarily mean that all available functions or all available relevant functions are inactive (disabled). The term 'inactive' may therefore mean in some contexts fully inhibited (fully disabled) and in other contexts may mean partially inhibited (partially enabled). The term 'active' may therefore mean in some contexts fully enabled and in other contexts may mean partially enabled.

In this example, the first means does not cause automatic transition from the first state 310 to the second state 320 in dependence upon the second condition 421 no longer being satisfied. It maintains the first state 310 in which the driver assistance system 200 is inactive while the second condition 421 is no longer satisfied and until the first condition 412 is satisfied. This controls when the driver assistance is inactive and when it is no longer inactive using different conditions.

In this example, the second means does not cause automatic transition from the second state 320 to the first state 310 in dependence upon the first condition 412 no longer being satisfied. It maintains the second state 320 in which the driver assistance system 200 is active while the first condition 412 is no longer satisfied and until the second condition 421 is satisfied. This controls when the driver assistance is active and when it is no longer active using different conditions.

Figure 1:
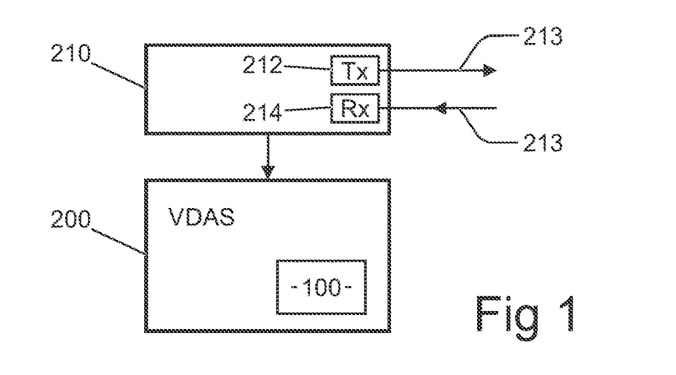
FIG. 1 illustrates an example of a control system for a vehicle driver assistance system using at least one transmitter/receiver sensor.

FIG. 1 illustrates an example of a control system 100 for a driver assistance system 200 using at least one transmitter/receiver sensor 210.

The control system 100 may be part of the driver assistance system 200 or separate from the driver assistance system 200.

The transmitter/receiver sensor 210 may be part of the driver assistance system 200 or control system 100, or may be separate from the driver assistance system 200 and control system 100.

The driver assistance system 200 uses at least one transmitter/receiver sensor 210. The transmitter/receiver sensor 210 comprises a transmitter 212 and a receiver 214. The transmitter 212 is configured to transmit a signal 213 that may be reflected by an object in the environment near to a vehicle which comprises or is connected to the driver assistance system 200. The receiver 214 is configured to detect a reflected signal 213 from the object.

The transmitter 212 may be configured to transmit, as the signal 213, electro-magnetic waves (e.g. radio waves for radio detection and ranging (radar) or light waves for light detection and ranging (lidar)) and the receiver 214 may be configured to detect the reflected electromagnetic waves.

The transmitter 212 may alternatively or additionally be configured to transmit, as the signal 213, ultrasonic sound waves and the receiver 214 may be configured to detect the reflected ultrasonic sound waves.

While the use of transmission and reflection to sense the environment may result is false positives (the detection of an object within the vehicle's environment which is determined to present a hazard to the vehicle, but where the object does not present a hazard), the control system 100 may be configured, as described below, to prevent or mitigate the occurrence of false positives and/or reduce the impact of such false positives on a driver's experience.

A driver assistance system 200 is a system that operates automatically or semi-automatically to assist a driver. Examples of a driver assistance system 200 include, for example, a system for performing one or more of: automatic collision avoidance, which may be high-speed collision avoidance, parking assistance, automatic braking such as autonomous emergency braking, automatic torque control/ vectoring, cruise control, automatic lighting, and/or automatic windscreen wiper operation.

A driver assistance system that automatically controls acceleration and/or deceleration of the vehicle is referred to herein as an acceleration-control assistance system. The driver assistance system 200 may be an acceleration-control assistance system.

A driver assistance system that is configured to perform automatic emergency braking, for example full-stop braking, of the vehicle is referred to herein as an emergency braking system. The driver assistance system 200 may be an emergency braking system. For example, it may be a parking assistance system that incorporates an emergency braking system.

Full-stop braking is applying a braking force to cause a deceleration not less than 5 m/s$^2$, sufficient to quickly stop the vehicle, until the vehicle has stopped, there has been a collision, or an event has caused an interrupt (e.g. a driver has caused an interrupt by for example depressing the accelerator pedal or e.g. the system has caused an interrupt because there is no longer a threat, for example because an obstacle has moved).

The intervention of the driver assistance system 200 is possible when the driver assistance system 200 is active and is not possible when the driver assistance system 200 is inactive.

Figure 2:
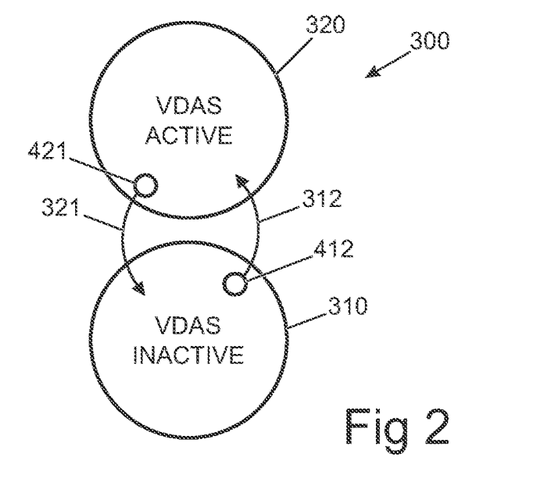
FIG. 2 illustrates an example of a state machine used by the control system.

As illustrated in FIG. 2, a state machine 300 may be used by the control system 100 of the driver assistance system 200 to control activity/inactivity of the driver assistance system 200.

The state machine 300 has a first state 310 in which the driver assistance system 200 is inactive and a second state 320 in which the driver assistance system 200 is active.

A transition 312 from the first state 310 to the second state 320 occurs automatically in dependence upon satisfaction of a first condition 412. That is when satisfaction of the first condition 412 is detected then the state machine 300 automatically transitions from the first state 310 to the second state 320.

A transition 321 from the second state 320 to the first state 310 occurs automatically in dependence upon satisfaction of a second condition 421. That is when satisfaction of the second condition 421 is detected then the state machine 300 automatically transitions from the second state 320 to the first state 310.

The likelihood of an incorrect automatic intervention by the driver assistance system 200 may be reduced by an appropriate selection of the first condition 412 and the second condition 421. Thus the likelihood of an incorrect automatic intervention by the driver assistance system 200 because of a false positive from the transmitter/receiver sensor 210 may be reduced by an appropriate selection of the first condition 412 and the second condition 421.

The control system 100 uses the state machine 300 to enable asymmetrical transitions between the first state 310 and the second state 320.

Satisfaction of the first condition 412 causes automatic transition 312 from the first state 310 to the second state 320 but non-satisfaction of the first condition 412 does not cause automatic transition from the second state 320. Thus automatic transition from the second state to the first state does not occur in dependence upon the first condition no longer being satisfied. The second state 320 in which the driver assistance system is active is maintained while the first condition 412 is no longer satisfied and until the second condition 421 is satisfied. This controls when the driver assistance is active and when it is no longer active using different conditions.

The asymmetry of the transition provides a memory effect which can be used to make the second state 320 more or less 'sticky' (i.e. more easily or less easily exited).

In some but not necessarily all examples, all transitions from the first state 310 to the second state 320 are asymmetric. The non-satisfaction of any or all conditions, the satisfaction of any one of which causes a transition from the first state 310 to the second state 320, does not necessarily cause a transition from the second state 320 to the first state 310.

Satisfaction of the second condition 421 causes automatic transition 321 from the second state 320 to the first state 310 but non-satisfaction of the second condition 421 does not cause automatic transition from the first state 310. Thus automatic transition from the first state 310 to the second state 320 does not occur in dependence upon the second condition 321 no longer being satisfied. The first state 310 in which the driver assistance system 200 is inactive is maintained while the second condition 421 is no longer satisfied and until the first condition 412 is satisfied. This controls when the driver assistance system 200 is inactive and when it is no longer inactive using different conditions.

The asymmetry of the transition provides a memory effect which can be used to make the first state 310 more or less 'sticky' (i.e. more easily or less easily exited).

In some but not necessarily all examples, all transitions from the second state 320 to the first state 310 are asymmetric. The non-satisfaction of any or all conditions, the satisfaction of any one of which causes a transition from the second state 320 to the first state 310, does not necessarily cause a transition from the first state 310 to the second state 320.

In some but not necessarily all examples, different parameters may be used to define different conditions for the first condition 412 and the second condition 421. In such examples, satisfaction of the first condition 412 comprises assessment by the control system 100 of at least one first parameter and satisfaction of the second condition 421 comprises assessment by the control system 100 of at least one second parameter, different to the first parameter. The use of different parameters enables the programming of the different conditions using the different parameters as different conditional variables.

In some but not necessarily all examples, different Boolean expressions may be used to define different conditions for the first condition 412 and the second condition 421. In such examples, satisfaction of the first condition 412 comprises assessment by the control system 100 of a first Boolean expression. The first condition 412 is satisfied when the first Boolean expression is true. Similarly, satisfaction of the second condition 421 comprises assessment by the control system 100 of a second Boolean expression, different to the first Boolean expression. The second condition 421 is satisfied when the second Boolean expression is true. The use of different Boolean expressions enables the programming of different conditions using different conditional logic.

The first Boolean expression may be a Boolean expression of first parameters. The second Boolean expression may be a Boolean expression of the first parameters or of second parameters different to the first parameters. In some but not necessarily all examples, the second condition 421 cannot be defined as a Boolean expression of the first parameters.

Figure 3:
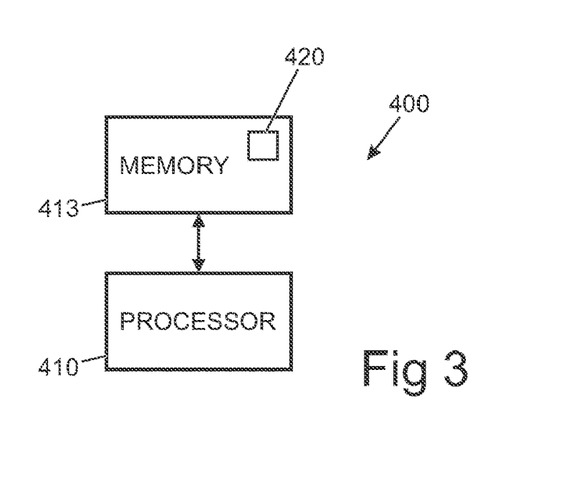
FIG. 3 illustrates an example of a controller configured to operate as the control system.

In some but not necessarily all examples, the control system 100 may be implemented as a controller 400.

Implementation of a controller 400 may be as controller circuitry. The controller 400 may be implemented in hardware alone, have certain aspects in software including firmware alone or can be a combination of hardware and software (including firmware).

As illustrated in FIG. 3 the controller 400 may be implemented using instructions that enable hardware functionality, for example, by using executable instructions of a computer program 420 in a general-purpose or special-purpose processor 410 that may be stored on a computer readable storage medium (disk, memory etc.) to be executed by such a processor 410.

The processor 410 is configured to read from and write to the memory 413. The processor 410 may also comprise an output interface via which data and/or commands are output by the processor 410 and an input interface via which data and/or commands are input to the processor 410.

The memory 413 stores a computer program 420 comprising computer program instructions (computer program code) that controls the operation of the controller 400 when loaded into the processor 410. The computer program instructions, of the computer program 420, provide the logic and routines that enables the apparatus to perform the methods illustrated in the accompanying Figs. The processor 410 by reading the memory 413 is able to load and execute the computer program 420.

The controller 400 therefore comprises:
at least one processor 410; and
at least one memory 413 including computer program code;
the at least one memory 413 and the computer program code configured to, with the at least one processor 410, cause the controller at least to perform:
automatic transition 312, between a first state 310 in which the driver assistance system 200 is inactive and a second state 320 in which the driver assistance system 200 is active, in dependence upon satisfaction of a first condition 412; and automatic transition 321 between the second state 320 and the first state 310 in dependence upon satisfaction of a second condition 421 different to the first condition 412.

The computer program 420 may arrive at the controller 400 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 420. The delivery mechanism may be a signal configured to reliably transfer the computer program 420. The controller may propagate or transmit the computer program 420 as a computer data signal.

Although the memory 413 is illustrated as a single component/circuitry it may be implemented as one or more separate components/circuitry some or all of which may be integrated/removable and/or may provide permanent/semi-permanent/dynamic/cached storage.

Although the processor 410 is illustrated as a single component/circuitry it may be implemented as one or more separate components/circuitry some or all of which may be integrated/removable. The processor 410 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 4:
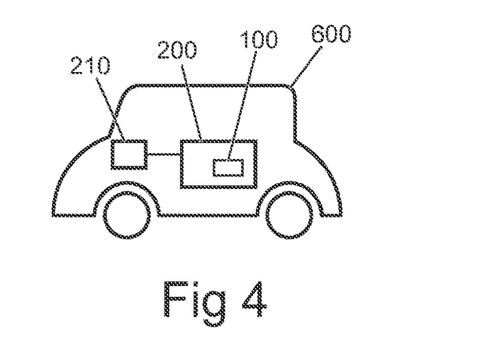
FIG. 4 illustrates an example of a vehicle comprising the control system.

FIG. 4 illustrates a vehicle 600 comprising the control system 100. The vehicle additionally comprises the transmitter/receiver sensor 210 and the driver assistance system 200.

The vehicle is at least partially controlled or capable of being at least partially controlled by a user (driver).

FIGS. 5 to 8 illustrate specific examples of the state machine 300 illustrated in FIG. 2. The same reference numerals are used to refer to the same features. Each of the state machines 300 has asymmetric transitions between the first state 310 and second state 320, for example, as described above.

Figure 5:
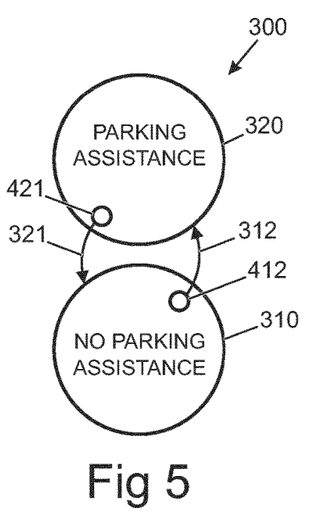
FIGS. 5 to 8 illustrate examples of the state machine illustrated in FIG. 2.

In the example of FIG. 5, the driver assistance system 200 is a parking assistance system that uses an ultrasonic transmitter/receiver sensor 210 which may comprise an emergency braking system. Additionally or alternatively, the driver assistance system 200 is an emergency braking system.

The control system 100 may have particular benefits for controlling low speed collision avoidance and/or emergency braking systems in a parking scenario by controlling the transitions between the first state 310, in which the driver assistance system 200 is inactive, and the second state 320, in which the driver assistance system 200 is active.

The control system 100 therefore controls when the driver assistance system 200 is active and when it is inactive.

The second state 320 is a state in which the driver assistance system 200 is active and the first state 310 is a state in which the driver assistance system 200 is inactive.

The first condition 412 for activating the driver assistance system 200 may be a condition that is indicative of a parking situation. The first condition may be a condition that is indicative of a parking situation with a high level of confidence (i.e. a confidence level above a threshold value) using, for example, multiple alternative sub-conditions. In some examples, the satisfaction of any one of these sub conditions may cause the transition from the first state 310 to the second state 320.

For example, the first condition 412 or a sub-condition may be Boolean logic expression dependent upon one or more of the following parameters that may be indicative of a parking situation:

selection of a parking system of the vehicle or a feature associated with parking such as an overhead view;

a high steering angle of the vehicle being above a threshold (set to differentiate lower steering angles that would typically be encountered on the open road from higher steering angles typically encountered in tight turns in a parking scenario);

a high steering angular rate (high steering angular velocity) of the vehicle above a threshold (set to differentiate lower steering angular rates that would typically be encountered on the open road from higher steering angular rates typically encountered in tight turns in a parking scenario), (a steering angular rate is the steering angle change over time and it may be calculated over different time periods from milliseconds to seconds);

selection of reverse gear of the vehicle;

reverse movement of the vehicle being greater than a threshold distance (selected to exclude typical distances that could be encountered when a vehicle rolls backwards during a hill start);

current position or geographic location of the vehicle (this may be compared against locations of known parking areas, or an area where the vehicle has previously been static or static and unoccupied for an extended duration);

interpretation of camera images obtained by a camera comprised within or connected to the vehicle to identify a parking situation e.g. parking signs, parking bays, roadside furniture, aligning with existing parked vehicles etc.;

data from the transmitter/receiver sensor 210;

speed of the vehicle being maintained below a threshold value for a threshold duration;

the vehicle having been static and/or unoccupied for an extended duration (indicates that vehicle has been parked so that next maneuver is likely to be pulling out of a parking space);

the vehicle having been in an ignition key-off state (indicates that vehicle has been parked so that next maneuver is likely to be pulling out of a parking space);

head movements and/or eye movements of a driver of the vehicle;

a high steering angle of the vehicle in combination with low vehicle speed or low vehicle acceleration (i.e. speed or acceleration being below a threshold value);

and reverse movement and inclination of the vehicle.

It will be appreciated that some of these parameters are vehicle kinematic parameters and measure displacement of the vehicle or an nth order differential of displacement with respect to time (e.g. velocity, acceleration . . . ). The kinematic parameter(s) depend upon a trajectory of the vehicle. The displacements may be linear displacement (e.g. velocity) or angular displacements (e.g. inclination or change in orientation)

It will be appreciated that some of these parameters are driver manoeuvre control parameters and measure actions taken by a driver to manoeuvre the vehicle.

It will be appreciated that some of these parameters are vehicle environment parameters and measure the contextual environment of the vehicle and/or how it changes which may be measured using external and/or internal sensors. This may, for example, include the geographic location of the vehicle and/or the vehicle's surroundings and/or the vehicle's occupancy.

One or more of these parameters may be used to define a first condition 412 or a sub-condition that is indicative of a need for parking assistance. One or more of these parameters may be used to define a first conditions 412 or a sub-condition that is indicative of a need for parking assistance to a high level of confidence (i.e. wherein the confidence level is above a threshold).

One or more of these parameters may be used to define a first condition 412 or a sub-condition that is indicative of a need for emergency braking assistance. One or more of these parameters may be used to define a first conditions 412 or a sub-condition that is indicative of a need for emergency braking assistance to a high level of confidence (i.e. wherein the confidence level is above a threshold).

The first condition 412 or a sub-condition may define, for example using Boolean logic, a first inhibition condition that prevents or inhibits the transition 312 from the first state 310 to the second state 320.

The first inhibition condition may, for example, define a situation in which the transition 312 from the first state 310 to the second state 320 could be dangerous.

For example, is may be desirable to disambiguate between a parking situation in which a vehicle is performing or about to perform a parking manoeuvre and a junction situation in which the vehicle is at a junction and is pulling out into traffic.

It may be that enabling conditions that are indicative of a parking situation may be insufficient to disambiguate between the parking situation and the junction situation.

It may be desirable to define a first inhibition condition that specifies a junction situation and prevents the transition 312 from the first state 310 to the second state 320.

For example, the transition inhibition condition for the first condition 412 may be Boolean logic expression dependent upon one or more of the following parameters that may, for example, be indicative of a junction situation:
- acceleration of the vehicle being above a threshold;
- accelerator pedal being depressed beyond a threshold distance;
- rate of increase of accelerator pedal depression beyond a threshold;
- current position or geographic location of the vehicle (this may be compared against locations of known road junctions or other on-road stop locations);
- detection of approaching vehicles or objects at speeds or acceleration above a threshold; and
- interpretation of camera images obtained by a camera comprised within or mounted to the vehicle to identify a junction situation (e.g. stop sign, stop line, traffic lights).

It will be appreciated that some of these parameters are vehicle kinematic parameters and measure displacement of the vehicle or an nth order differential of displacement with respect to time (e.g. acceleration, rate of change of acceleration . . . ). The kinematic parameter(s) depend upon a trajectory of the vehicle. The displacements may be linear displacement (e.g. velocity) or angular displacements (e.g. inclination or change in orientation)

It will be appreciated that some of these parameters are driver manoeuvre control parameters and measure actions taken by a driver to manoeuvre the vehicle (e.g. accelerator pedal depression)

It will be appreciated that some of these parameters are vehicle environment parameters and measure the contextual environment of the vehicle and/or how it changes which may be measured using external and/or internal sensors. This may, for example, include the geographic location of the vehicle and/or the vehicle's surroundings.

The first inhibition condition for the first condition 412 may in some examples be the second condition. The second condition may in some examples be the first inhibition condition for the first condition 412.

There is consequently provided a control system 100 for braking driver control system 200 in the form of an emergency braking system using at least one transmitter/receiver sensor 210, wherein the control system 100 comprises: means for causing automatic transition, from a first state 310 in which the emergency braking system 200 is inactive to a second state 320 in which the emergency braking system 200 is active, in dependence upon satisfaction of a first group of different requisite conditions 412.

If all of the necessary conditions in the group of different requisite conditions is satisfied, then automatic transition can occur. If any one of the necessary conditions in the group of different requisite conditions is not satisfied, then automatic transition cannot occur.

The first group of different requisite conditions 412 comprises a low vehicle speed condition (i.e. speed of the vehicle being below a threshold value) and at least one first additional condition. The at least one first additional condition may be dependent upon one or more kinematic parameters and/or one or more driver maneuver control parameters and/or one or more vehicle environment parameters.

The second condition 421 for de-activating the emergency braking system 200 may be a condition that is indicative of the vehicle no longer being in a parking situation. The condition may be indicative of the vehicle no longer being in a parking situation with a high level of confidence (i.e. confidence level above a threshold value) using, for example, multiple sub-conditions. In some examples, the satisfaction of any one of these sub-conditions may cause the transition from the second state 320 to the first state 310 in other examples a logical combination of conditions must be satisfied.

The control system 100 may, for example, comprise: means for causing automatic transition, to a first state 310 in which the emergency braking system 200 is inactive from a second state 320 in which the emergency braking system 200 is active, in dependence upon satisfaction of a second group of different requisite conditions 421.

Figure 6:
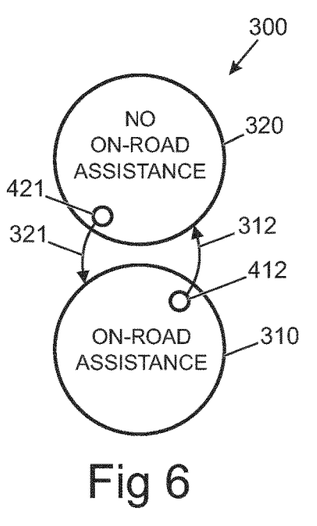

In the example of FIG. 6, the first state 320 is a state in which an on-road driver assistance system is active and the vehicle driver assistance system 200 is inactive. The second state 320 is a state in which the on-road driver assistance system is inactive and the driver assistance system 200 is active.

The second condition 421 for de-activating the driver assistance system 200 may be a condition that is indicative of an on-road situation. The second condition 421 for de-activating the driver assistance system 200 may be a condition that is indicative of an on-road situation with a high level of confidence (i.e. confidence level above a threshold value) using multiple sub-conditions for example. In some examples, the satisfaction of any one of these sub conditions may cause the transition from the second state 320 to the first state 310.

For example, the second condition 421 or a sub-condition may be Boolean logic expression dependent upon one or more of the following parameters that may be indicative of an on-road driving situation:
- speed of the vehicle being above a threshold;
- acceleration of the vehicle being above a threshold;
- accelerator pedal being depressed beyond a threshold distance;
- rate of increase of accelerator pedal depression beyond a threshold;
- high gear (e.g. above first gear) during forward motion of the vehicle;
- current position or geographic location of the vehicle (this may be compared against locations of known road junctions or other on-road stopping or low-speed/slowing locations);
- traffic in the vicinity of the vehicle suggests free flow conditions on an open road; detection of approaching vehicles or objects at speeds or acceleration above a threshold;
- data from the transmitter/receiver sensor 210; and
- interpretation of camera images obtained from a camera comprised within or mounted to the vehicle (e.g. vehicle travelling parallel to detected road center line markings, interpretation of exterior vehicle camera images to identify a traffic queue situation;
- interpretation of camera images obtained by a camera comprised within or connected to the vehicle to identify parallel structures transverse to the movement of the vehicle which form an interruption or discontinuity in the road surface, which may be expansion joints, guttering, trench plates, tram lines or railway lines at a level crossing, for example).

One or more of these parameters may be used to define a second condition 421 or a sub-condition that is indicative of a need for on-road driver assistance. The second condition 421 or sub-condition may be indicative of a need for on-road driver assistance to a high level of confidence (i.e. confidence level above a threshold value).

It will be appreciated that some of these parameters are vehicle kinematic parameters and measure displacement of the vehicle or an nth order differential of displacement with respect to time (e.g. acceleration, rate of change of acceleration . . . ). It will be appreciated that some of these parameters are driver manoeuvre control parameters and measure actions taken by a driver to manoeuvre the vehicle (e.g. accelerator pedal depression).

It will be appreciated that some of these parameters are vehicle environment parameters and measure the contextual environment of the vehicle and/or how it changes which may be measured using external and/or internal sensors. This may, for example, include the geographic location of the vehicle and/or the vehicle's surroundings.

The state machine 300 of FIG. 5 and the state machine 300 of FIG. 6 may be combined. The second state 320 is then a state in which the driver assistance system 200 in the form of a parking assistance system is active and in which the on-road driver assistance system is inactive. The first state 310 is then a state in which the parking assistance system 200 is inactive and in which the on-road driver assistance system is active. The second condition 421 may be indicative of a need for on-road driver assistance to a high level of confidence (i.e. confidence level above a threshold value) and/or be indicative that there is no longer a need for parking assistance to a high level of confidence. The first condition 412 may be indicative of a need for parking assistance to a high level of confidence and/or be indicative that there is no longer a need for on-road driver assistance to a high level of confidence.

Figure 7:
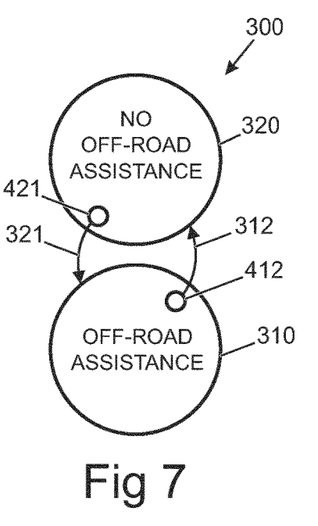

In the example of FIG. 7, the first state 320 is a state in which an off-road driver assistance system is active and the driver assistance system 200 is inactive. The second state 320 is a state in which the off-road driver assistance system is inactive and the driver assistance system 200 is active.

The second condition 421 for de-activating the driver assistance system 200 may be a condition that is indicative of an off-road situation. The condition may be indicative of an off-road situation with a high level of confidence (i.e. confidence level above a threshold value) using multiple sub-conditions, for example. In some examples, the satisfaction of any one of these sub conditions may cause the transition from the second state 320 to the first state 310.

For example, the second condition 421 or a sub-condition may be a Boolean logic expression dependent upon one or more of the following parameters that may be indicative of an off-road driving situation (an example of an off-road driving situation is wading through water):
- movement of the suspension of the vehicle beyond a threshold distance;
- selection of a system of a vehicle for off-road use (e.g. low transmission ratio, increased ride height);
- interpretation of camera images obtained by a camera comprised within or mounted to the vehicle;
- current geographic location of the vehicle indicates an off-road situation; data from the transmitter/receiver sensor 210;
- wheel slip data of the vehicle indicates low adhesion surface; and scanning of driving surface indicates high roughness/irregularity or other off-road characteristics.

One or more of these parameters may be used to define a second condition 421 or sub-condition that is indicative of a need for off-road driver assistance. One or more of these parameters may be used to define a second condition 421 or sub-condition that is indicative of a need for off-road driver assistance to a high level of confidence (i.e. confidence level above a threshold value).

It will be appreciated that some of these parameters are vehicle kinematic parameters and measure displacement of the vehicle or an nth order differential of displacement with respect to time (e.g. suspension movement). It will be appreciated that some of these parameters are driver manoeuvre control parameters and measure actions taken by a driver to a manoeuvre the vehicle. It will be appreciated that some of these parameters are vehicle environment parameters and measure the contextual environment of the vehicle and/or how it changes which may be measured using external and/or internal sensors. This may, for example, include the geographic location of the vehicle and/or the vehicle's surroundings.

The state machine 300 of FIG. 5 and the state machine 300 of FIG. 7 may be combined. The second state 320 is then a state in which the driver assistance system 200 in the form of a parking assistance system is active and in which the off-road driver assistance system is inactive. The first state 310 is then a state in which the parking assistance system 200 is inactive and in which the off-road driver assistance system is active. The second condition 421 may be indicative of a need for off-road driver assistance to a high level of confidence (confidence level above a threshold) and/or be indicative that there is no longer a need for parking assistance to a high level of confidence. The first condition 412 may be indicative of a need for parking assistance to a high level of confidence and/or be indicative that there is no longer a need for off-road driver assistance to a high level of confidence.

Figure 8:
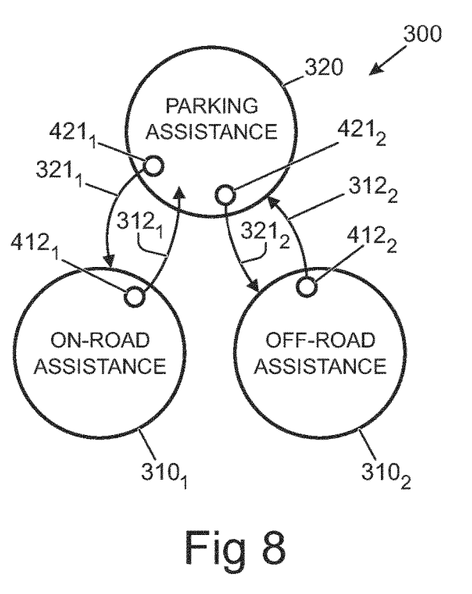

In the example of FIG. 8, the state machine 300 of FIG. 5, the state machine 300 of FIG. 6 and the state machine 300 of FIG. 7 may be combined.

The state $310_1$ is equivalent to the first state 310 in FIG. 6. The transition $321_1$ is equivalent to the transition 321 in FIG. 6. The transition $312_1$ is equivalent to the transition 312 in FIG. 6. The condition $412_1$ for transition $312_1$ is equivalent to the condition 412 in FIG. 6. The condition $421_1$ for transition $321_1$ is equivalent to the condition 421 in FIG. 6.

The state $310_2$ is equivalent to the first state 310 in FIG. 7. The transition $321_2$ is equivalent to the transition 321 in FIG. 7. The transition $312_2$ is equivalent to the transition 312 in FIG. 7. The condition $412_2$ for transition $312_2$ is equivalent to the condition 412 in FIG. 7. The condition $421_2$ for transition $321_2$ is equivalent to the condition 421 in FIG. 7.

The second state 320 is equivalent to the second state 320 in FIGS. 5, 6 and 7.

The state $320_1$ is a state in which an on-road driver assistance system is active and the driver assistance system 200 is inactive.

The state $310_2$ is a state in which an off-road driver assistance system is active and the driver assistance system 200 is inactive.

The second state 320 is a state in which the on-road driver assistance system is inactive, the off-road driver assistance system is inactive and the driver assistance system 200 is active.

Figure 9:
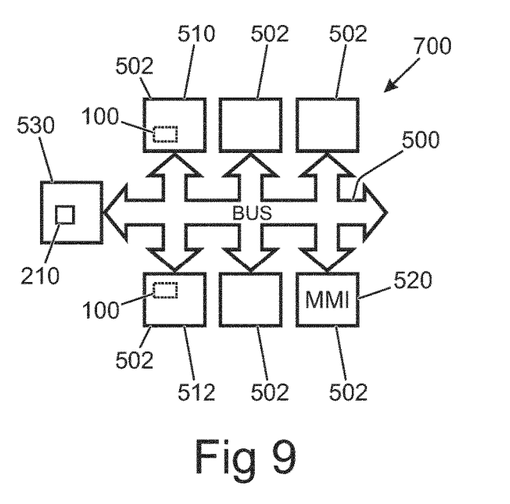
FIG. 9 illustrates an example of a vehicle system suitable for functioning as the control system.

FIG. 9 illustrates an example of a vehicle system 700 suitable for performing the methods previously described and suitable for functioning as the control system 100 described.

In this example, the vehicle system 700 comprises a vehicle bus 500 (for example, a controller area network (CAN) bus) and a plurality of vehicle bus nodes 502. One or more of the vehicle bus nodes 502 may be vehicle electronic control units (ECU) that comprise transceivers enabling them to communicate via the vehicle bus 300 and additional controller circuitry. Electronic control units are used to control particular functions of the vehicle.

Each of the vehicle bus nodes 302 performs a different function. This distributed architecture may be used when implementing the control system 100. For example, one or more of the vehicle bus nodes 302 whether or not they are electronic control units (ECU) may be capable of performing some or all of the functions of at least some of the components of the control system 100 and/or the driver assistance system 200 and/or the on-road driver assistance system and/or the off-road driver assistance system.

For example, the control system 100 may be comprised wholly or partly within a parking control ECU 510 of a vehicle.

For example, the control system 100 may be comprised wholly or partly within an assisted braking ECU 512 of a vehicle.

The control system 100 may use the vehicle bus 500 to receive input from sensors 530 which may, for example, include transmitter/receiver sensor(s) 210. The input from one or more sensors 530 may be used to define the first condition 412 and/or the second condition 421.

A man machine interface module 520 may enable a user (driver) of the vehicle 600 to input an interrupt that forces the control system 100 to transition to the first state 310 and/or to input an interrupt that forces the control system 100 to transition to the second state 320. This allows a user to over-ride the state machine 300. The interrupt is transmitted over the bus 500 and is received by the control system 100. The control system 100 then forces an appropriate transition of the state machine 300.

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

As used here 'module' refers to a unit or apparatus that excludes certain parts/components that would be added by an end manufacturer or a user.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A control system for an emergency braking system of a vehicle, the control system comprising: at least one processor and associated memory, the at least one processor being configured to cause automatic transition from a first state in which the emergency braking system is inactive, such that emergency braking directed by the control system is inhibited, to a second state in which the emergency braking system is active, such that the braking system is able to apply emergency braking if directed by the control system, in dependence upon satisfaction of a first condition;

the at least one processor being configured to cause automatic transition from the second state to the first state in dependence upon satisfaction of a second condition different from the first condition;

wherein satisfaction of the first condition comprises assessment by the control system of at least one first parameter derived from data obtained when in the first state from the at least one sensor;

wherein satisfaction of the second condition comprises assessment by the control system of at least one second parameter derived from data obtained when in the second state from the sensor;

the processor being configured to maintain the first state until the first condition is satisfied;

the processor being configured to maintain the second state until the second condition is satisfied;

the processor being configured not to cause transition from at least one of the first or second state to the other of the second or first state in dependence upon the corresponding one of the first or second condition no longer being satisfied.

2. The control system as claimed in claim 1, wherein the at least one sensor is an ultrasonic sensor, a radar sensor or a lidar sensor.

3. The control system as claimed in claim 1, wherein the emergency braking system is a parking assistance system.

4. The control system as claimed in claim 1, wherein the emergency braking system is an on-road vehicle driver assistance system.

5. The control system as claimed in claim 1, wherein the emergency braking system is an off-road vehicle driver assistance system.

6. The control system as claimed in claim 1, wherein the transition between the first state and the second state is asymmetric.

7. The control system as claimed in claim 6, wherein all transitions from the first state to the second state are asymmetric.

8. The control system as claimed in claim 1, wherein the first parameter and the second parameter are different.

9. The control system as claimed in claim 1, wherein the first condition is defined by a first Boolean expression of first parameters and the first condition is satisfied when the first Boolean expression is true.

10. The control system as claimed in claim 9, wherein the second condition cannot be defined as a Boolean expression of the first parameters.

11. The control system as claimed in claim 1, wherein the second condition is defined by a second Boolean expression of second parameters and the second condition is satisfied when the second Boolean expression is true.

12. The control system as claimed in claim 1, wherein the processor is configured to determine satisfaction of the first condition based on information regarding one or more of:
   selection of a parking system of the vehicle;
   a high steering angle of the vehicle;
   selection of reverse gear of the vehicle;
   high steering angular velocity of the vehicle;
   reverse movement of the vehicle greater than a threshold distance;
   a current geographic location of the vehicle;
   interpretation of images obtained by a camera within or mounted to the vehicle;
   data from the at least one sensor;
   a speed of the vehicle maintained below a threshold value for a threshold duration;
   the vehicle being at least one of static and unoccupied for an extended duration;
   the vehicle being in an ignition key-off state;
   at least one of head movements and eye movements of a driver of the vehicle;
   a high steering angle in combination with low speed or low acceleration of the vehicle; and
   reverse movement and inclination of the vehicle.

13. The control system as claimed in claim 1, wherein the processor is configured to determine satisfaction of the second condition based on information regarding one or more of:
   a speed of the vehicle being above a threshold value;
   acceleration of the vehicle being above a threshold value;
   an accelerator pedal of the vehicle being depressed beyond a threshold distance;
   a rate of increase of accelerator pedal depression above a threshold;
   high gear during forward motion of the vehicle;
   a current location of the vehicle;
   data from the at least one sensor;
   interpretation of camera images obtained by a camera within or mounted to the vehicle;
   traffic in a vicinity of the vehicle suggests free flow conditions on an open road; and
   detection of approaching vehicles or objects at speeds or acceleration above a threshold.

14. The control system as claimed in claim 1, wherein the controller is configured to determine satisfaction of the second condition based on information regarding one or more of:
   suspension movement of the vehicle above a threshold value;
   selection of a system of the vehicle for off-road use;
   interpretation of camera images obtained by a camera within or mounted to the vehicle;
   a current location of the vehicle;
   data from the at least one sensor;
   wheel slip data from the vehicle indicates a low adhesion surface; and
   scanning of a driving surface indicates high roughness, irregularity or other off-road characteristics.

15. The control system as claimed in claim 1, wherein a user input interrupt satisfies the second condition or the first condition and forces the control system to transition to the first state or to transition to the second state.

16. The control system as claimed in claim 1, wherein the second state provides for autonomous emergency braking at low speed and the first state does not provide for autonomous emergency braking at low speed.

17. The control system as claimed in claim 1, wherein the control system is included within at least one of a parking control module of the vehicle, an assisted braking module of the vehicle, and an electronic control unit of the vehicle.

18. A vehicle comprising the control system as claimed in claim 1.

19. A method of controlling an emergency braking system of a vehicle, the method comprising:
- determining whether a first condition is satisfied by assessing at least one first parameter obtained derived from data obtained when in a first state from at least one sensor;
- determining whether a second condition different from the first condition is satisfied by assessing at least one second parameter derived from data obtained when in a second state from the at least one sensor;
- causing automatic transition from t-the first state to a-the second state in dependence upon satisfaction of the first condition, wherein the first state comprises the emergency braking system being inactive such that emergency braking directed by the system is inhibited, and wherein the second state comprises the emergency braking system being active such that the braking system is able to apply emergency braking if directed by the system;
- causing automatic transition from the second state to the first state in dependence upon satisfaction of the second condition; and
- maintaining the first state until the first condition is satisfied or maintaining the second state until the second condition is satisfied, wherein transition from at least one of the first state or the second state to the other of the second state or the first state does not occur in dependence upon the corresponding one of the first condition or the second condition no longer being satisfied.

20. A non-transitory, computer-readable storage medium storing instructions thereon that when executed by one or more processors causes the one or more processors to carry out the method of claim 19.

* * * * *

UNITED STATES PATENT AND TRADEMARK OFFICE
CERTIFICATE OF CORRECTION

PATENT NO. : 11,565,668 B2
APPLICATION NO. : 16/340234
DATED : January 31, 2023
INVENTOR(S) : Aitidis et al.

It is certified that error appears in the above-identified patent and that said Letters Patent is hereby corrected as shown below:

In the Claims

Claim 1, Column 25, Line 19, change "the at least one sensor" to --at least one sensor--.

Claim 1, Column 25, Line 23, change "the sensor" to --at least one sensor--.

Signed and Sealed this
Fourteenth Day of March, 2023

Katherine Kelly Vidal
*Director of the United States Patent and Trademark Office*